(No Model.) 6 Sheets—Sheet 1.

LA VERNE W. NOYES.
SELF BINDING HARVESTER.

No. 366,501. Patented July 12, 1887.

(No Model.)

6 Sheets—Sheet 2.

LA VERNE W. NOYES.
SELF BINDING HARVESTER.

No. 366,501. Patented July 12, 1887.

Witnesses:
Frank S. Blanchard
Edward Owings Towne

Inventor
La Verne W. Noyes
By Chas. S. Burton
Atty.

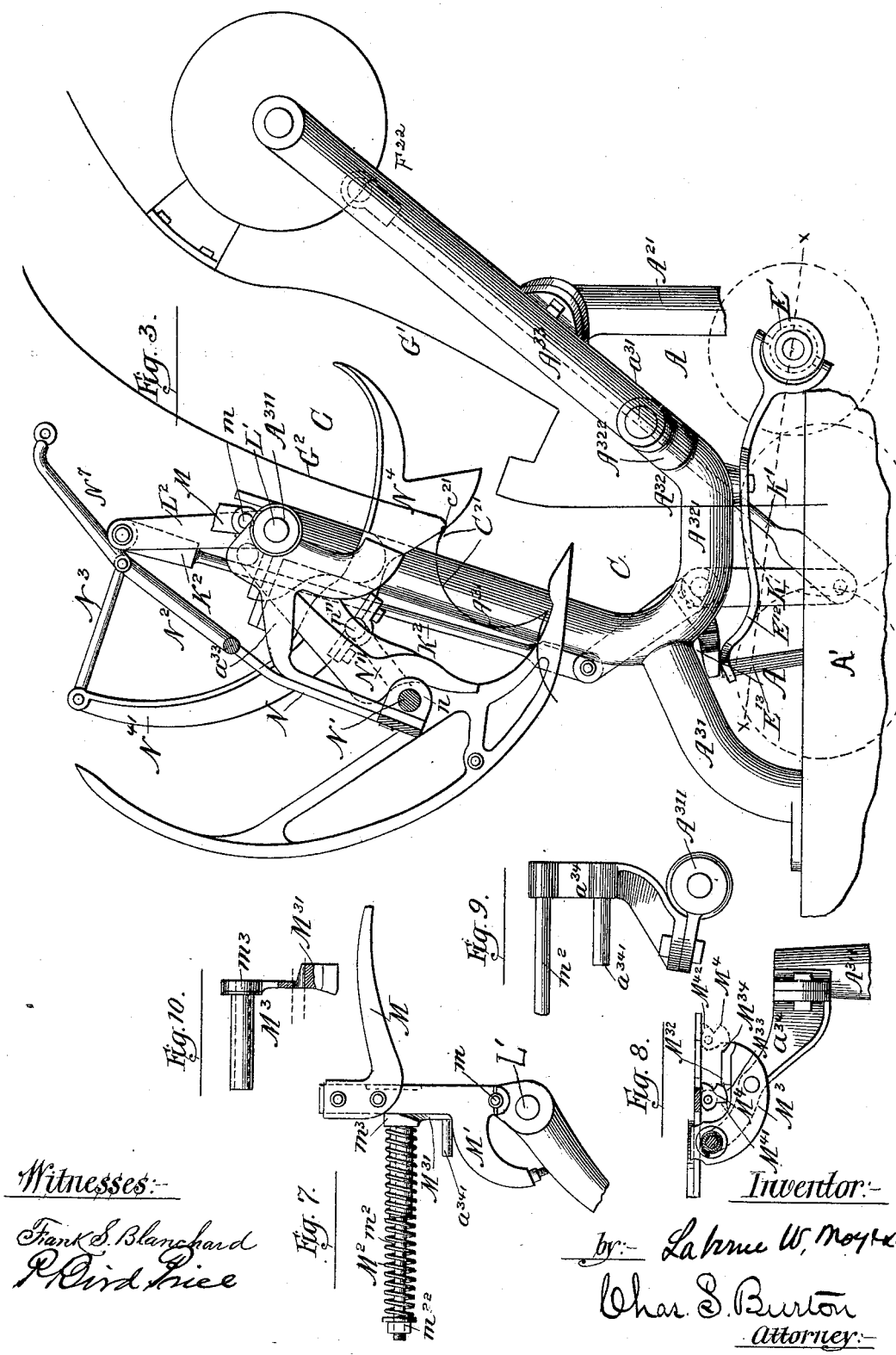

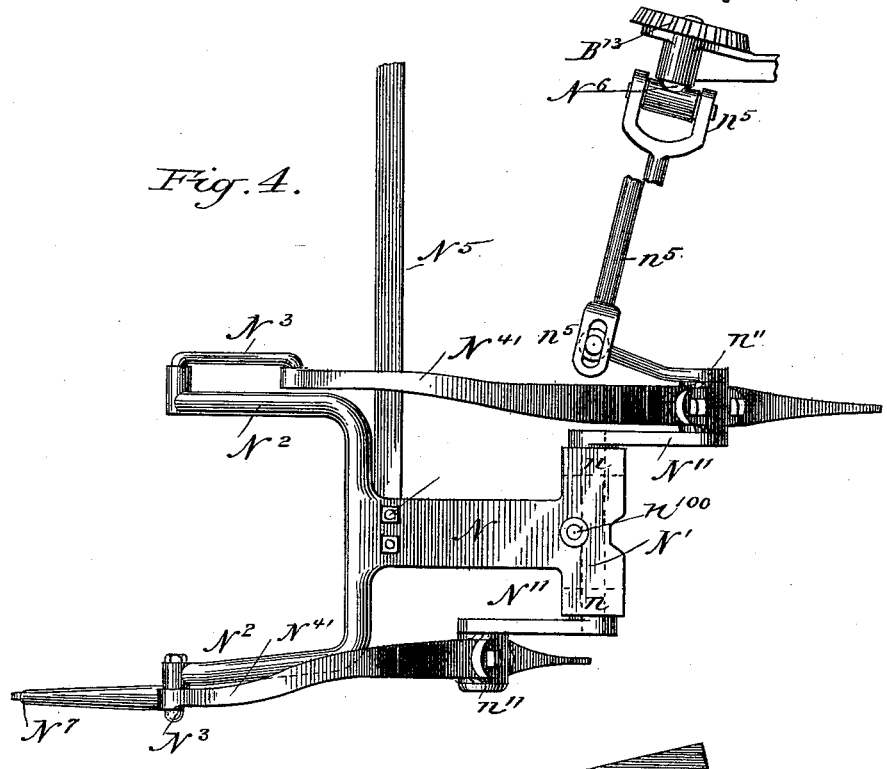

(No Model.) 6 Sheets—Sheet 5.

LA VERNE W. NOYES.
SELF BINDING HARVESTER.

No. 366,501. Patented July 12, 1887.

Witnesses:
Frank J. Blanchard
P. Bird Price

Inventor:
LaVerne W. Noyes
By Chas. S. Burton
Attorney (No Model.)

LA VERNE W. NOYES.
SELF BINDING HARVESTER.

No. 366,501.   Patented July 12, 1887.

6 Sheets—Sheet 6.

Witnesses:
Frank J. Blanchard
Francis W. Parker

Inventor:
LaVerne W. Noyes
By Chas. D. Burton
Attorney.

UNITED STATES PATENT OFFICE.

LA VERNE W. NOYES, OF CHICAGO, ILLINOIS.

SELF-BINDING HARVESTER.

SPECIFICATION forming part of Letters Patent No. 366,501, dated July 12, 1887.

Application filed June 29, 1885. Serial No. 170,143. (No model.)

*To all whom it may concern:*

Be it known that I, LA VERNE W. NOYES, a citizen of the United States, residing at Chicago, in the county of Cook and State of Illinois, have invented certain new and useful Improvements in Self-Binding Harvesters, which are fully set forth in the following specification.

This invention relates to self-binding harvesters, which form and bind the bundle in an upright position, and comprise improved mechanism for that purpose.

Figure 1:
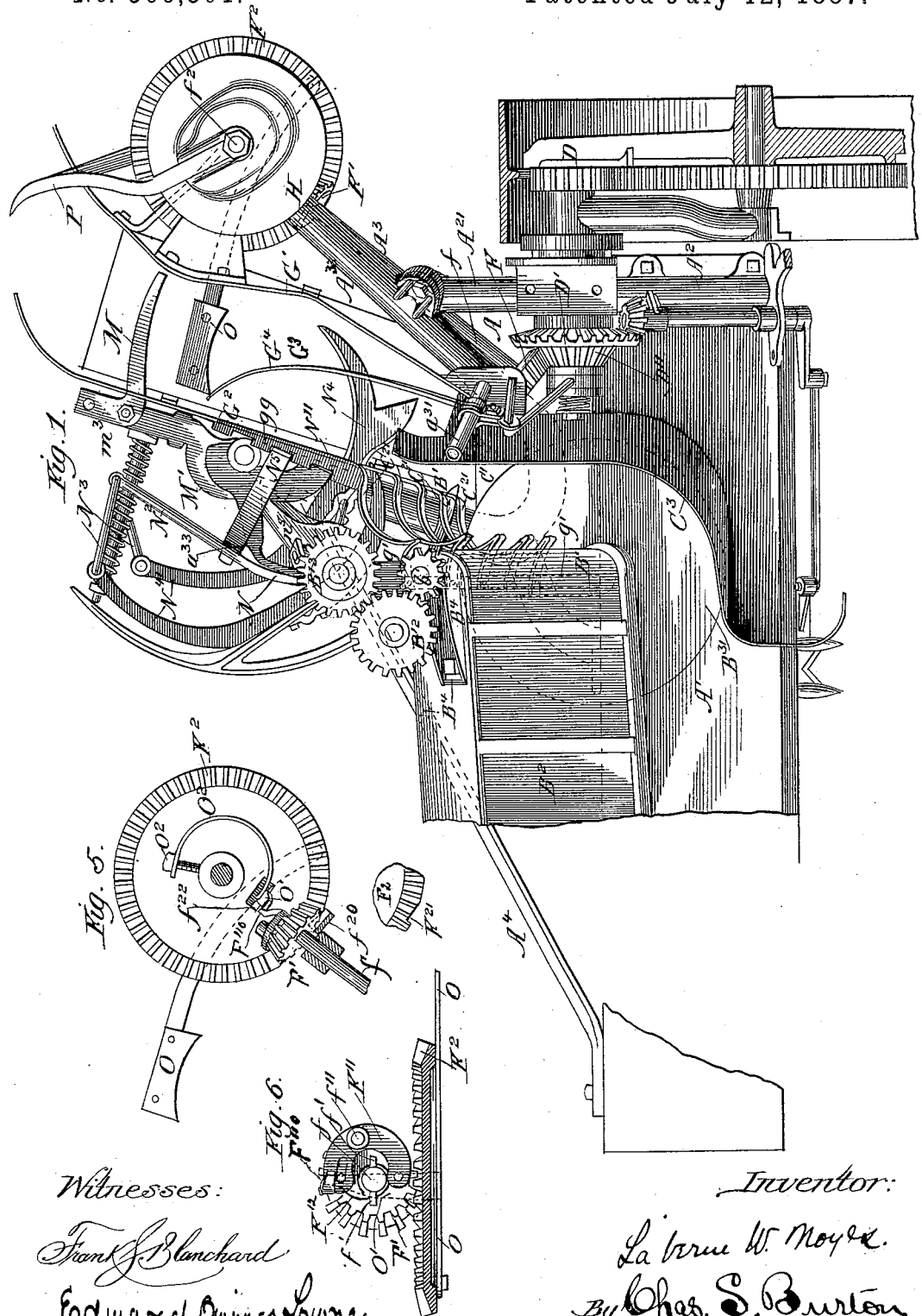
Figure 2:
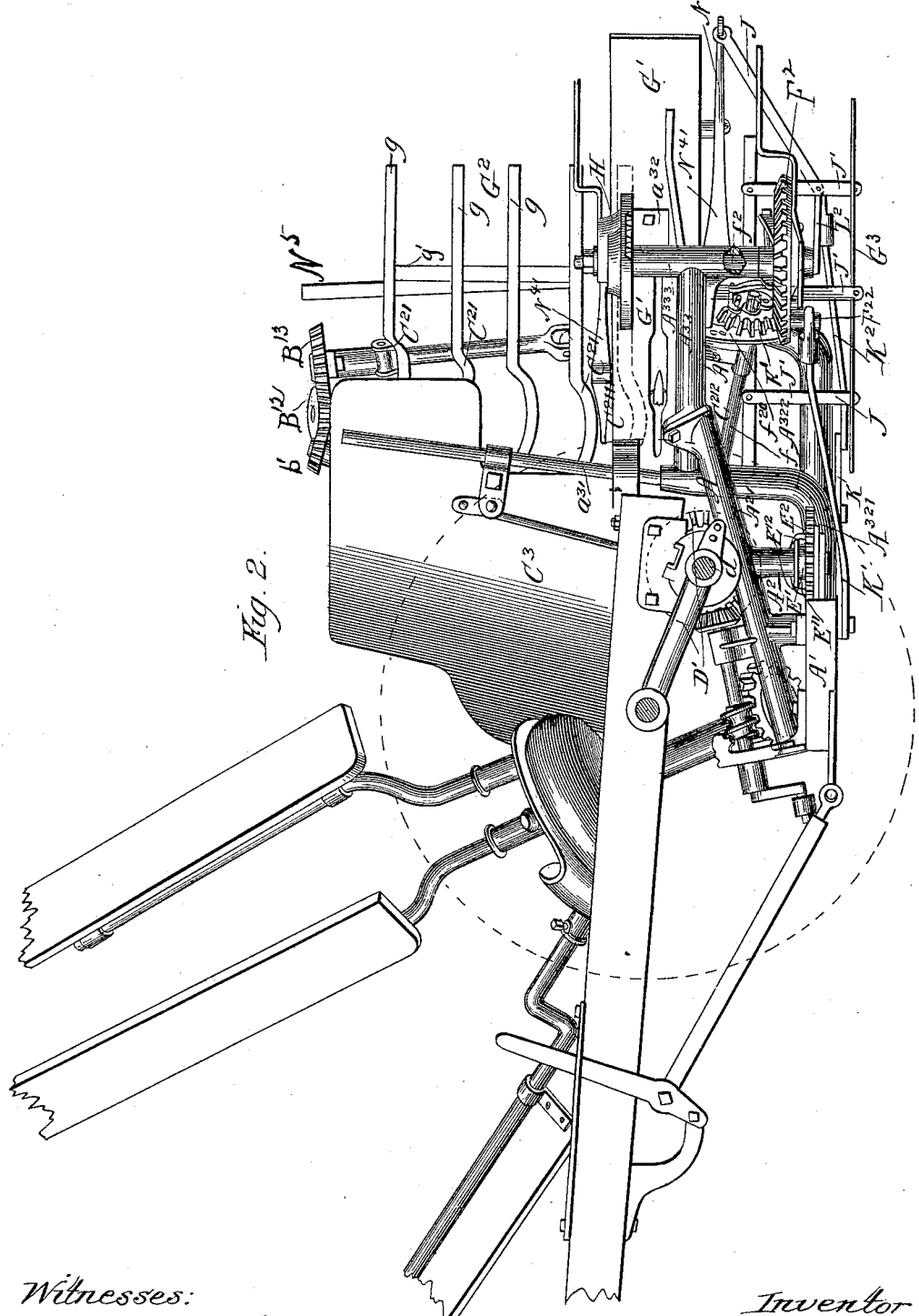
Figure 11:
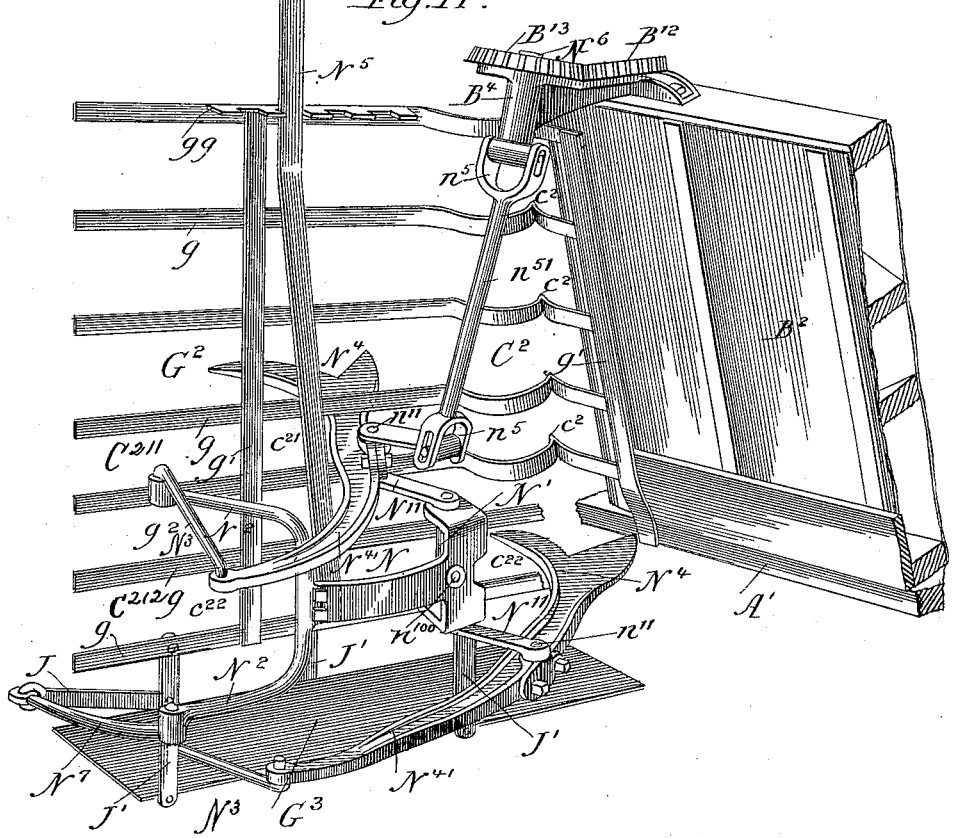
Figure 12:
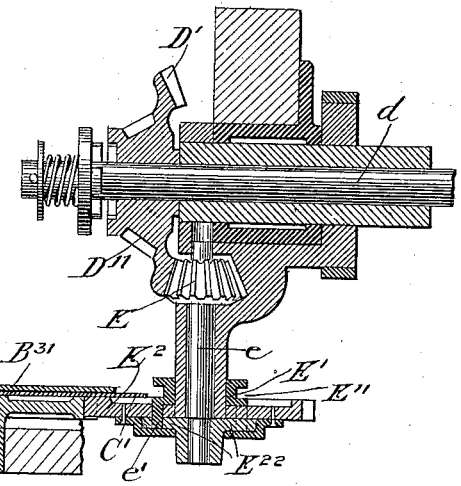
Figure 14:
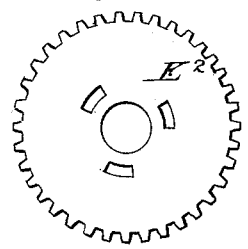
Figure 15:
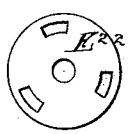
Figure 16:
Figure 17:
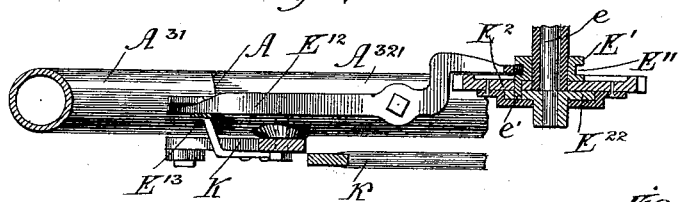
Figure 19:
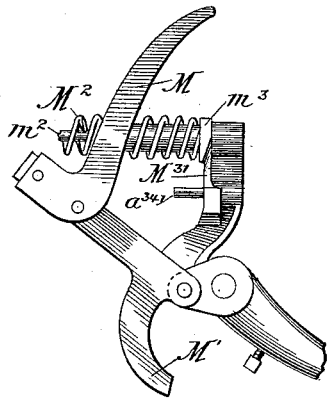
Figure 18:
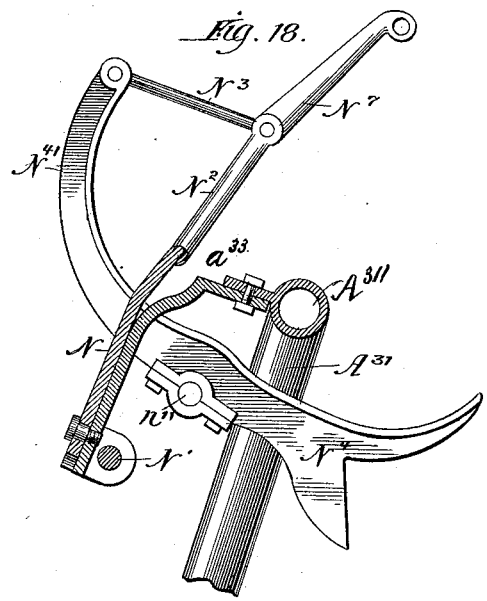

In the drawings, Figure 1 is a plan. Fig. 2 is an outside elevation. Fig. 3 is a detail plan of the binder cage, frame, needle, and packers. Fig. 4 is an inner side elevation of the packer-frame, packers, and connected mechanism. Fig. 5 is a plan, and Fig. 6 an elevation, of the binder-tripping device. Fig. 7 is a plan, and Fig. 8 a detail elevation, of the compressor. Fig. 9 is a detail plan of a bracket which supports the compressor. Fig. 10 is a partly sectional plan of a slide-stop pertaining to the compressor action. Fig. 11 is an inside perspective of the binder-cage and packer. Fig. 12 is a section through the conveyer-actuating gearing. Fig. 13 is a detail plan of a horizontal butt-carrying device, showing also the connection by which it derives motion from the conveyer-driving train. Fig. 14 is a plan of a gear-wheel in the conveyer-train, which is clutched to its driving-shaft. Fig. 15 is a plan of the disk fixed to said shaft for the purpose of actuating said wheel, Fig. 14. Fig. 16 is a perspective of the clutch which connects said gear-wheel and clutch-disk, the same being turned upside down to show more clearly its clutch-teeth. Fig. 17 is a sectional elevation of the levers which actuate said clutch, showing the frame in elevation and the entire clutching device in vertical section, the section being as taken at the line $x\,x$, Fig. 3. Fig. 18 is a horizontal section through the packer-frame and binder-frame, taken at the pivot of said frames. Fig. 19 is a detail plan showing the compressor in the position at the instant of discharge of the bundle.

A is the combined harvester and binder frame. It comprises the plank A', which supports the conveyer, the bracket A², which carries the driving-gearing, and is hereinafter called the "gearing-frame," and the bracket A³, which carries the binder mechanism, and is called the "binder-frame."

Upon the plank A' is mounted the conveyer B, which is fully described and claimed in my application No. 170,142, filed June 29, 1885, and is not claimed in this application. As illustrated, it is an endless conveyer, though other familiar forms might be used. It is sustained nearly upright, being slightly inclined rearward, the base resting a few inches in the rear of the sickle, and operates horizontally and carries the grain on end toward the drive-wheel, acting as a wall to sustain the grain and prevent it falling prostrate after it is severed by the sickles, and as a conveyer to move it laterally while thus kept upright. It is actuated by the train of gears E², E³, and E⁴, the last of which is fixed on the shaft of the roller B', and causes said roller to drive the endless belt B² of the conveyer.

The action of the conveyer may be supplemented at its stubble end by a horizontal butt-carrier, upon which the grain shall stand and be moved within reach of the packers after the butts have passed beyond the action of the conveyer. Said butt-carrier may be the horizontal disk B³¹, fixed to the gear E⁴ and revolving with it, and thus assisting to turn the grain around the end of the conveyer; or it may be in the form of the reciprocating plate B³², provided on its upper surface with the ratchet-like projecting ribs $b^{32}$, preferably having serrated edges, as illustrated, said plate being actuated by the intermediate gear, E³, by means of the link E³¹, connecting said plate B³² to the crank-pin E³¹ on said gear, and being guided by any convenient means, as by the arm B³²¹, extending to the pivot $a'$ on the plank A', so that its motion shall be in the desired direction to move the grain toward the binder.

By the conveyer the grain is delivered into the receptacle C, which is bounded at the bottom by the floor C', which covers the gearing E², E³, and E⁴, and over which the butt-carrier B³¹, of whatever form, operates to move the grain toward the rear of said receptacle. The further boundaries of the receptacle are the inner upright or slightly-inclined wall, C², and the front and outer upright or inclined wall, C³. The latter begins in front of the conveyer at a line grainward from the delivery end of the conveyer, thus slightly overlapping it. Thence it curves around rearward and stubbleward, crossing the vertical plane of the conveyer at some distance from its delivery end, between it and the drive-wheel, tending to deflect the grain from the course in which it is delivered from the conveyer, which is about at right angles with the vertical plane of the drive-wheel to a course which shall carry it alongside and toward the rear of the latter, and extends directly rearward and joins the binder-cage wall, thus serving by its form to guide the grain around the end of the conveyer and direct it rearward into the binder-cage. The inner wall, $C^2$, has its front edge preferably provided with the fingers $c^2$, located and adapted to strip the teeth of the conveyer, and at a short distance to the rear of said fingers said wall $C^2$ is deflected almost or quite at a right angle to its first direction and made to extend across toward the outer wall, $C^3$, thereby forming a partial rear wall, $C^{21}$, and restricting the rear opening from the receptacle into the binder-cage to a comparatively narrow vertical rift. The wall $C^2$, including the part $C^{21}$, is horizontally rifted at $C^{211}$ and $C^{212}$, for the passage of the packers, hereinafter described. As illustrated, it is made integral and continuous with the inner wall of the binder-cage, hereinafter described. The floor $C'$ extends rearward beyond the wall $C^{21}$ and terminates at the entrance to the adjustable floor of the binder-cage, hereinafter described. To the upper end of the shaft of the roller $B'$ is fixed the slightly-beveled gear-wheel $b'$, and driven by it is the idle-gear $B^{12}$, which drives the packer-driving gear $B^{13}$. Both of said gears, as well as the shaft of the roller $B'$, are journaled in the bracket $B^4$, secured to the upper outer corner of the frame of the conveyer B.

The gearing-frame $A^2$ has the bearings for the shaft $d$ of the main driving-pinion D. To said shaft $d$ is clutched the bevel gear-wheel $D'$, which meshes with and drives the bevel gear-wheel E on the short vertical shaft $e$, to which is clutched the gear-wheel $E^2$, as hereinafter explained in detail. The gear-wheel $E^2$ actuates the remainder of the train—the wheels $E^3$ and $E^4$—to drive the conveyer, as above stated.

The binder-frame (the bracket $A^3$) consists of the horizontal arm $A^{31}$, which, at the front end, is secured to the plank $A'$, and at the rear has the vertical box $A^{311}$ for the needle rock-shaft, the cross-neck $A^{32}$, having the horizontal portion $A^{321}$ and the vertical portion $A^{322}$ and the horizontal arm $A^{33}$, which has the vertical box $A^{333}$ for the binder-shaft. The bracket $A^3$ is braced firmly by its connection with the bracket $A^2$, the rearwardly-extended arm $A^{21}$ of the latter being bolted fast to the arm $A^{33}$ of the former about midway of the length of the said arm $A^{33}$. It may be further braced by the brace $A^4$, extending from the arm $A^{31}$, inwardly and forward to the plank $A'$, to which it is secured near its inner end, thus preventing, almost absolutely, any spreading of the frame on account of the pressure exerted in compacting and binding the bundle. The following adjuncts of the binder-frame may be formed integral therewith, but, for convenience of casting, are preferably made separate and bolted to said frame—viz., the upright arm or spur $a^{31}$, extended upward from the angle between the arm $A^{322}$ and the arm $A^{33}$, the bracket $a^{32}$, secured to the inner side of the box $A^{333}$ and affording bearings for the knotting mechanism, the bracket $a^{33}$, secured on the inner (grainward) side of the arm $A^{31}$ and furnishing support for parts hereinafter described, and the bracket $a^{34}$, secured to the vertical box $A^{311}$, and serving a purpose hereinafter stated.

The binder-cage G is bounded by the breast-plate or outer wall, $G'$, the inner wall, $G^2$, corresponding to the deck or binder-table of a harvester which handles the grain prostrate, and the adjustable floor $G^3$, corresponding to the butt-board. It is entered at the front through the rift $c^{21}$. At the rear the breast-plate $G'$ and the inner wall, $G^2$, curve outward, and the point of exit of the bundle from said binder-cage is thereby located about in the rear of the drive-wheel. The breast-plate $G'$ is secured to the upright arm $A^{322}$ and to the spur $a^{31}$ and to the bracket $a^{32}$. The inner wall, $G^2$, is secured to the box $A^{311}$ and to the arm $A^{31}$, and being made as integral with the wall $C^2$ of the receptacle C, the further fastening is effected by securing said wall $C^2$ at the top to the upper bar of the frame of the conveyer B and at the bottom to the plank $A'$. As illustrated, both the wall $C^2$ and the wall $G^2$ consist of strips $g$, secured, as above stated, and bound together by suitable cross-strips, $g'$, and the fingers $c^2$ are but the ends of said strips, or portions of them, bent in such manner as to protrude as ends, and the rifts $C^{211}$ and $C^{212}$ for the packers, and the further rift, $g^2$, for the needle, are merely the spaces between said strips.

For the purpose of supporting and restraining the heads of the grain when it is long, there is provided the spring-arm $G^4$, secured near the upper end of the spur $a^{31}$ and standing obliquely across the course of the grain, through the cage G, and having its rear end curved inward to check any tendency of the heads of the grain to fall to the rear.

The binding mechanism is driven by the bevel gear-wheel $D'$, which has for that purpose on its inner face the gear-rim $D^{11}$, meshing with and driving the bevel-pinion F, which is fixed on and drives the oblique shaft $f$, which is journaled in suitable boxes on the arm $A^{33}$ of the binder-frame $A^3$, and is provided at its rear end with the bevel-pinion $F'$, which meshes with and drives the binder-actuating gear-wheel $F^2$, whose shaft $f^2$ is journaled in the vertical box $A^{333}$ on the arm $A^{33}$, and carries at its upper end the knotter-actuating wheel H. The pinion $F'$ is loose on the shaft $f$, and mechanism, hereinafter described, is provided to lock it to its said shaft and disengage it at proper time.

To the horizontal portion $A^{321}$ of the neck $A^{32}$ of the binder-frame $A^3$ is pivoted, on the under side, the bell-crank lever K, and to one end of it is connected the link K', which is connected also to the binder gear-wheel $F^2$, being pivoted on the crank-pin $F^{22}$ on its under side. To the other end of the lever K is connected the link $K^2$, which is connected also to the crank $L^2$ of the needle rock-shaft L', and by means of said connections the binder-actuating gear-wheel $F^2$ is made to actuate the needle rock-shaft.

The compressor M is pivoted to the needle, eccentrically to its rock-shaft, and has the tail M', extending around past that shaft and adapted to engage and be stopped and actuated by the web of the needle-arm on the opposite side of the shaft. It is hinged or pivoted to the upper end of its pivot $m$, so as to oscillate laterally—that is, in the direction of the length of the bundle, which, on account of the position of the binder in this machine, is vertically—and in the rear of said pivot $m$ it is supported upon the bracket $a^{34}$, and bears against the shoulder $n^3$ of the yielding stop $M^3$, which slides on the rod $m^2$, which is rigid with and extends horizontally off from the bracket $a^{34}$, and has coiled about it the spring $M^2$, which is held between said yielding stop $M^3$ and the adjustable head or stop-nut $m^{22}$, screwed onto the said rod. Said stop $M^3$ slides on the rod $m^2$ and has the tail $M^{31}$, which is similarly guided on the stud-pin $a^{341}$, rooted in the bracket $a^{34}$, so that said stop, when pushed away from the bracket $a^{34}$, is in all positions guided parallel to its position when resting against it. The upper surface of the stop $M^3$ has the cam-track $M^{32}$ for the dog or trip $M^4$, which is pivoted on the under side of the compressor M. The function and operation of these parts will be hereinafter described.

The packer-frame N has the bearings $n$ $n$ for the packer crank-shaft N', and is pivoted to the bracket $a^{33}$, the axis of its pivot $n^{100}$ being nearly in the same plane with the axis of the crank-shaft, and preferably about at right angles to said crank-shaft, being horizontal if the latter is vertical, as illustrated, and is located about midway between the planes of the cranks $N^{11}$. Said frame N is extended rearward in two arms, $N^2$ $N^2$, to which are pivoted the links $N^3$ $N^3$, which are connected, respectively, to the tails $N^{11}$ $N^{41}$ of the packers $N^4$ $N^4$, which are journaled in the usual manner on the wrists $n^{11}$ of the cranks $N^{11}$. The crank-shaft N' is connected at its upper end by the tumbling or universal joints $n^5$ and the tumbling-shaft $n^{51}$ to the shaft $N^6$, which is driven by the gear-wheel $B^{13}$, journaled in the bracket $B^4$, as hereinbefore stated. To the packer-frame N is secured the arm or handle $N^5$, which extends upward past the notched upper bar, $g$ $g$, of the inner wall of the binder-cage, and is adapted to engage said notches.

The function of the above-described structure of the packer-frame is to adjust the packers to long and short grain, as fully hereinafter explained, and it is adapted to carry with it the floor $G^3$, which is suspended by the links J' from the upright walls of the binder-cage, and is connected by the link J to the tail $N^7$ of said packer-frame N.

O is the trip. It is pivoted to the under side of the binder gear-wheel $F^2$, the pivot standing, when the binder is at rest, on the side opposite the binder-cage, and the trip extending across the back or under side of said gear-wheel and projecting into the cage in the path of the bundle forward of the compressor M. It has the tooth or finger O', constituting a latch, protruding up through the web of the wheel $F^2$, (a slot, $f^{22}$, being made for that purpose,) and stands vertically across the face of the pinion F'. The spring $O^2$, secured to the hub of the gear $F^2$ by the screw $o^2$, which also serves, by being screwed farther in or out of the hub, to regulate its tension and thereby fix the size of the bundle, tends to keep the latch O' close in front of the pinion F'. The shaft $f$ is furnished near its end with two radial projections or teeth, $f'$ $f'$, back of which, on said shaft, the pinion F' is loosely journaled.

To the face of the pinion F' is pivoted eccentrically the dog $F^{11}$, which is curved around the shaft and has its end $F^{110}$ bent forward, so as to project out into the path of the upper end of the latch O'. It has the stud and roll $f^{11}$, fixed at such point between its pivot and its projecting end that it may be engaged by the teeth $f'$ when the dog $F^{11}$ is thrown inward by the spring $F^{12}$, which is provided and coiled about its pivot for that purpose. When the binder is at rest, the latch O' is in engagement with the protruding end of the dog $F^{11}$, and holds the stud and roll $f^{11}$ out of the path of rotation of the teeth $f'$, and thereby permits the shaft $f$ to revolve without actuating the binder. The gear-wheel $F^2$ is locked in this position and prevented from being reversed by means of the spring-pawl $f^{20}$, fixed on the arm $A^{33}$ and adapted to engage the notch $F^{21}$ on the rim of the wheel $F^2$.

The gear-wheel $E^2$ is clutched to the shaft $e$ by the clutch E', whose clutch-teeth pass through the web of and engage the horizontal gear-wheel $E^2$, and below said gear-wheel may engage the clutch-rim $E^{22}$, which is revolved continuously with the shaft $e$. Said clutch E' has the peripheral groove $E^{11}$, in which the forked lever $E^{12}$ engages. Said lever is supported on a horizontal pivot fixed to the side of the horizontal portion $A^{321}$ of the neck $A^{32}$, and at the inner end is bent into such position that it is engaged and depressed by the lever K at the instant the latter starts—i. e., when the binder is tripped into action. The depression of the inner end of said lever raises the outer end and causes it to lift the clutch E' out of engagement with the clutch-rim $E^{22}$ on the shaft $e$, and thereby cuts off the conveyer and, through it, the packers, from the driving power, and causes their action to cease until the lever K returns to its position of rest—that is, until the binder ceases its action.

The above-described mechanism may be more fully understood by considering its operation consecutively in the order of the several processes.

The grain severed by the sickle is delivered on end by the upright conveyer into the receptacle C, being carried around the end of the conveyer, the disk $B^{31}$ assisting to turn the grain, which is also guided to the same effect by the outer wall, $C^3$. Being stripped from the fingers of the conveyer as they pass by the protruding fingers $c^2$ of the inner wall of the receptacle, the grain is impelled against the rear wall, $C^{21}$, of the said receptacle. The contact with the walls of the receptacle C has a tendency to straighten up the grain if it is delivered in a leaning position. Being thus accumulated in the receptacle, the packers $N^4$, moving alternately through the rifts $e^{211}$, grasp the grain and sweep it outward past the obstruction formed by the wall $C^{21}$ and pack it into the binder-cage G. If the grain is long, the packer-frame N will be set by means of the handle $N^5$, so that the packers will sweep downward against the grain as they engage it, and thereby the grain will be set downward as it is advanced into the binder-cage. The floor of the said binder-cage, being connected by the link J to the tail $N^7$ of the packer-frame N, will be set lower by the same movement which adjusts the packers, as described, so that the vertical space for the grain will be increased simultaneously with the movement which causes it to require said space.

It will be noticed that the height of the packers at the middle point of their sweep is not appreciably changed by the adjustment, since the pivot of the packer from N is nearly in the same plane as the packer-shaft, and about midway between the packer-cranks, but that the packers when adjusted, as described, for long grain reach higher to grasp the grain and carry it lower, which is as designed and necessary for the purpose.

Another use may be made of the adjustability of the packer-frame in handling grain of which the straw is green or for any other reason is very soft and easily bent. When such grain reaches the discharge end of the conveyer, it is usually somewhat retarded at the butts, and is therefore delivered toward the binder leaning excessively rearward, or in some cases, if it is short, almost prostrate; and when the packers engage it, instead of straightening it up, as they would do if it were dry, they are liable to break or bend it at the point where they strike it and drag it into the binder with the butt-ends prostrate, and only the head portion upright, or nearly so, so that the bundle is rendered very uneven, and the grain following is further retarded by the protruding butts of such broken straw. This result may be prevented by setting the packer-frame so that the lower packer shall strike into the receptacle and engage the straw at the lowest possible point, almost at the very floor of the receptacle, so that there is not length of straw below the point where they strike it sufficient to cause the damage above described. The heads of such grain leaning rearward will have found support either upon the straw already in the binder or upon the binding-cord, and being thus engaged at the butt-end by the packers will be caused to slide up on the straw or cord into an upright position, and may thus be bound evenly.

When enough grain has been accumulated to force the trip O, the latter yields toward the compressor and its finger, the latch O' is disengaged from the end of the dog $F^{11}$, which is thereupon thrown by the spring $F^{12}$ in against the shaft $f$, and the tooth $f'$ of the latter engages the stud-roll $f^{11}$, and rotates the pinion $F'$ and the binder gear-wheel $F^2$, and thereby the knotter-actuating wheel H, and, through the connection afforded by the links K' and $K^2$ and the lever K, the needle rock-shaft L' and needle L. As the trip is revolved with the wheel $F^2$, it passes by the compressor M, which thereafter sustains the bundle at the rear, and as the needle L swings around to encircle the bundle, it draws the compressor M forward against the bundle, on the rear side thereof, said compressor being guided by the stop $M^3$ while it rests and slides on the upper edge of the bracket $a^{34}$, and forcing back the stop $M^3$ against the pressure of the spring $M^2$, if the pressure of the bundle is sufficient to cause it to do so. While the compressor is being thus drawn against the bundle, the dog $M^4$ at first hangs free in the hollowed portion $M^{33}$ of the upper edge of the stop $M^3$, and afterward is lifted rearward and rides on the elevated cam-track $M^{32}$ until, just before the needle starts back, it passes said elevated track and falls into the depression $M^{34}$ in front of it; and when the needle reverses its movement the edge $M^{41}$ comes into contact with the shoulder $m^{32}$ of the cam-track $M^{32}$, and, being restrained by the stop $M^{12}$ from swinging forward, it acts as a cam and rides up onto said elevated portion of the cam-track $M^{32}$, and lifts the compressor M clear of the shoulder $m^3$ of the stop $M^3$, and leaves it free to yield to the expansion of the bundle and the force of the discharger P, which is fixed upon the binder-actuating gear-wheel $F^2$, and, revolving in a horizontal plane with it, comes at this instant in behind the bundle and begins to eject it toward the rear of the machine. The compressor at the instant it clears the shoulder $m^3$, being perfectly free to swing on its pivot to the needle, flies back into the position shown in Fig. 19, out of the way of the bundle, leaving a clear path for its discharge. As the needle retreats toward its initial position of rest, its web encounters the tail M' of the compressor M, and pushes the latter back to its initial position, which it regains by "climbing" over the shoulder $m^3$ of the stop $M^3$, its own under edge and the edge of said shoulder being beveled for that purpose. Meanwhile the dog $M^4$ has dropped off at the rear end of the elevated cam-track M³² and hangs freely in the depression M³³, as at starting. While the latter part of the last-described action has been progressing, the gear-wheel F² has revolved, carrying the latch O' around into engagement with the end of the dog F¹¹, and has thereby lifted the latter out of engagement with the tooth f' of the shaft f, and thereupon the action of the binder ceases, leaving the gear-wheel F² in such position that its notch F²¹ has just passed the edge of the spring-latch f²⁰, so that the latter has engaged said notch and detains said wheel against retrogression. The starting of the binder caused the lever K to actuate the lever E¹² and disengage the clutch E' from the shaft e, and thereby brought the conveyer and packers to a stop. The return of the lever K to its position of rest disengages it from the lever E¹², and permits the re-engagement of the clutch E' with the shaft, which may be assisted and rendered more prompt by means of the spring E¹³. The conveyer and packers thus resume their action instantly upon the cessation of the action of the binder.

The distinctive features of a self-binding harvester thus constructed being the horizontal action of the packers, needle, and discharger, it should be observed, nevertheless, that the mode of adjusting to long and short grain—viz., by changing the angle of the planes of action of the packers—is applicable equally to binders wherein the grain is bound prostrate and the packers consequently operate in vertical planes; also, that the action and mechanism for controlling the action of the trip and of the compressor are applicable equally to machines of the more familiar type mentioned. The connecting-neck between the arm of the binder-frame, which has the bearings for the knotter-actuating shaft, and that which has the needle rock-shaft is located so far forward—i.e., so near the axle—first, in order to avoid overbalancing the machine backward, by placing that portion of the weight farther to the rear, and, secondly, for the reason that since the grain is not elevated at all, but, on the contrary, when long, is depressed at the binder, the floor of the binder-cage may sometimes be as near the ground as the sickle, and thus ride on the stubble, there would therefore be no room underneath said floor for the connecting-neck and the necessary link to connect the needle rock-shaft to the binder gear-wheel.

The oblique direction stubbleward of the frame is adopted in order to bring the weight as directly as possible over the drive-wheel, that it may contribute to the traction of the wheel, and, by relieving the grain-wheel, prevent side draft. The entire form of the frame is therefore dictated by the purposes of balancing the frame on the drive-wheel and delivering the bundle to the ground with the least possible shock.

I claim—

1. In a self-binding harvester, in combination with the conveyer adapted to deliver the grain sidewise on end within reach of the packers, said packers operating in approximately horizontal planes to seize the grain so delivered, and means for varying at will the planes of motion of said packers, to cause them to incline slightly from the horizontal direction, substantially as and for the purpose set forth.

2. In combination with the conveyer carrying and delivering the grain standing on end, the packer-frame pivoted to the main frame and movable in a vertical plane about its pivot, the packer-shaft journaled therein approximately vertically, and the packers sustained thereon and operated by the packer-shaft in planes at right angles thereto, and means, substantially as described, for turning the packer-frame on its pivot to vary the direction of the planes of action of the packers and cause them to engage the grain at any desired distance above the butt-ends.

3. In combination with the conveyer delivering the grain sidewise on end within reach of the packers, a packer-frame pivoted upon the principal frame and adapted to rock in substantially a vertical plane over said pivot, and packers having their shaft journaled in said packer-frame and operating in approximately horizontal planes near the level of the pivot of said packer-frame, substantially as set forth.

4. In a self-binding harvester, in combination with the pivoted packer-frame, the butt-board connected thereto and automatically adjusted thereby, substantially as set forth.

5. In combination with the vertical binder-cage G, having its receiving end on the grain side of the vertical plane of the drive-wheel, the vertical shaft which carries the knotter-actuating wheel H, and the horizontal binder-actuating wheel F², located on the stubble side of said binder-cage, substantially as set forth.

6. In combination with the conveyer delivering the grain standing on end inside the vertical plane of the drive-wheel, the binder-cage located rearward and stubbleward from the delivery end of the conveyer, and the binding arm or needle operating in approximately horizontal plane, having its rock-shaft located rearward from the conveyer and on the grain-ward side of the binder-cage, substantially as set forth.

7. In combination with the conveyer delivering the grain on end inside the drive-wheel, the binder-actuating wheel F², located behind the drive-wheel, and the packing mechanism and binder-arm operating in horizontal planes and moving the grain obliquely stubbleward, substantially as set forth.

8. In a self-binding harvester, an upright binder-cage, packing mechanism located and adapted to store the grain on end therein, a binder whose binding arm moves in an unvarying horizontal plane into said cage, and means for raising and lowering the floor of said cage at will to adjust the grain of different lengths to the binder-arm, substantially as set forth.

9. In combination with the binder-frame, comprising two rigid arms projected rearward from the gearing and platform frame, the binder-floor, vertically adjustable, located between the vertical planes of said arms, and the lever K, pivoted to the frame forward of the binder-floor, to afford means of connection from the knotter-actuating shaft to the needle rock-shaft without interfering with said vertical adjustment of the floor, substantially as set forth.

10. In combination with the upright binder-cage having a vertically-adjustable floor, the vertical binder-actuating shaft at one side of the cage, the vertical needle rock-shaft at the other side of the cage, the lever K, pivoted to the frame underneath beyond one end of the cage, and the links which connect said lever to the crank-arms of the binder-actuating shaft and the needle rock-shaft, respectively, substantially as set forth.

11. In a self-binding harvester, in combination with the gearing-frame and the conveyer-sill rigidly united, the binder-frame rigidly joined to said frame and to said sill and having its two horizontal diverging arms, which have, respectively, the bearings for the knotter-actuating wheel and the bearings for the needle rock-shaft diagonally braced, the one to the gearing bracket or frame and the other to the conveyer-sill, substantially as and for the purpose set forth.

12. In a self-binding harvester, in combination with the frame which carries the gearing and the cutting mechanism, a rigid binder-frame rigidly joined thereto in the rear of the line of the conveyer-sill, said binder-frame having its shaft-supporting arms projected rearward and connected at the front, substantially as set forth.

13. In a self-binding harvester, in combination with the gearing-frame and the binder-frame rigidly united as one, the main driving-pinion shaft journaled in horizontal bearings in said combined frame, the knotter-actuating-wheel shaft journaled in vertical bearings, and an intermediate shaft suitably journaled on said combined frames, and bevel-gears on said shafts, respectively, whereby power is transmitted from the main driving-pinion shaft directly to the intermediate shaft and thence directly to the vertical knotter-actuating shaft, substantially as set forth.

14. In a self-binding harvester, in combination, substantially as and for the purpose set forth, the binder gear-wheel $F^2$, fixed on the shaft of the knotter-actuating wheel, and the trip pivoted to and revolving with said gear-wheel.

15. In combination, substantially as and for the purpose set forth, the gear-wheel $F^2$ and the trip and latch revolving therewith, and the pinion $F'$ and the mechanism for locking it to its driving-shaft, adapted to be actuated by the trip-latch to disengage it from the shaft.

16. In combination, substantially as and for the purpose set forth, the gear-wheel $F^2$ and the trip and latch revolving therewith, said gear-wheel having the notch $F^{21}$ on its rim, the gear-pinion $F'$, and the mechanism for locking it to its driving-shaft, adapted to be actuated by the trip-latch to disengage it from the shaft, and the spring-pawl $f^{20}$, fixed to the bearing of said gear-wheel $F^2$, and located and adapted to engage the notch $F^{21}$ when the trip-latch disengages the pinion $F'$.

17. In combination, substantially as and for the purpose set forth, the gear-wheel $F^2$, the trip pivoted thereto and provided with the latch $O'$ and the spring $O^2$, the pinion $F'$, the dog $F^{11}$, pivoted eccentrically on said pinion and provided with the stud and roll $f^{11}$ and with the spring $F^{12}$, and the shaft $f$, carrying said pinion $F'$ and having the teeth $f'f'$ to engage the stud and roll.

18. In combination, substantially as and for the purpose set forth, the needle, the compressor pivoted eccentrically thereto and engaged at a point other than its pivot (as on the heel $M'$,) by the needle in its reverse movement only, a stop, $M^3$, sustained by the frame and against which the compressor is guided and held opposed to the needle during its advance, a dog or trip, $M^4$, on the compressor engaging the stop, at $M^{34}$, at the retreating movement of the compressor and guiding the latter clear of the stop, whereby the compressor is left free to yield out of the path of the bundle, and is returned to its initial position by the needle engaging it at the latter part of the retreating movement of the needle.

19. In combination with the needle, the compressor pivoted eccentrically thereto, the guide-stop $M^3$, having the cam-track $M^{32}$, and the dog $M^4$, pivoted to the compressor and located and adapted to travel over said cam-track, substantially as and for the purpose set forth.

20. In combination with the needle, the compressor pivoted eccentrically thereto, the guide-stop $M^3$, having the cam-track $M^{32}$ and the slide-bearings for said stop on the frame, the compressor-spring $M^2$, and the dog $M^4$, pivoted to the compressor and located and adapted to follow said cam-track, substantially as and for the purpose set forth.

21. In combination with the needle, the compressor pivoted eccentrically thereto and having the tail extending beyond the needle-center and adapted to be engaged and pushed by the web of the needle, the guide-stop $M^3$, having the cam-track $M^{32}$, and the dog $M^4$, pivoted to the compressor and located and adapted to travel over said cam-track, substantially as and for the purpose set forth.

22. In combination with the trip secured to and revolving with the wheel $F^2$ on the knotter-actuating shaft, and thereby withdrawn from the path of the bundle when the binder starts, the compressor located and adapted to stand, when the needle is at rest, in the path of the bundle and farther therefrom than the trip, substantially as and for the purpose set forth.

23. In combination with the horizontally-operating butt-carrier, carrying the grain standing on end rearward past the end of the conveyer, packers operating in horizontal planes, their movement being rearward from that of the butt-carrier's movement, and a binder-arm moving in a horizontal plane, also in the rear of the butt-carrier, substantially as set forth.

In testimony whereof I have hereunto set my hand, in the presence of two witnesses, at Chicago, Illinois, this 24th day of June, A. D. 1885.

LA VERNE W. NOYES.

Attest:
C. H. THORPE,
CHAS. S. BURTON.